(12) United States Patent
Abramovsky et al.

(10) Patent No.: US 12,328,726 B2
(45) Date of Patent: Jun. 10, 2025

(54) ADAPTIVE TTI BUNDLING CONFIGURATION

(71) Applicant: Parallel Wireless, Inc., Nashua, NH (US)

(72) Inventors: Benjamin Abramovsky, Petah Tiqwa (IL); Ido Shaked, Alfei Menashe (IL)

(73) Assignee: Parallel Wireless, Inc., Nashua, NH (US)

( * ) Notice: Subject to any disclaimer, the term of this patent is extended or adjusted under 35 U.S.C. 154(b) by 503 days.

(21) Appl. No.: 17/556,085

(22) Filed: Dec. 20, 2021

(65) Prior Publication Data

US 2022/0201730 A1 Jun. 23, 2022

Related U.S. Application Data

(60) Provisional application No. 63/127,496, filed on Dec. 18, 2020.

(51) Int. Cl.
*H04W 72/20* (2023.01)
*H04L 1/1867* (2023.01)

(52) U.S. Cl.
CPC ............ *H04W 72/20* (2023.01); *H04L 1/189* (2013.01)

(58) Field of Classification Search
CPC .. H04W 72/20; H04W 72/0446; H04L 1/189; H04L 1/1896; H04L 1/1822
See application file for complete search history.

(56) References Cited

U.S. PATENT DOCUMENTS

| | | | | |
|---|---|---|---|---|
| 10,129,005 B2* | 11/2018 | Kim | ...................... | H04W 24/02 |
| 2010/0034158 A1* | 2/2010 | Meylan | .................. | H04W 24/10 |
| | | | | 370/252 |
| 2012/0327782 A1* | 12/2012 | Tanaka | .................... | H04L 41/12 |
| | | | | 370/241 |
| 2016/0135170 A1* | 5/2016 | Chen | ................. | H04W 72/0446 |
| | | | | 370/336 |
| 2019/0075589 A1* | 3/2019 | Jeon | ...................... | H04L 1/1819 |

OTHER PUBLICATIONS

LTE; Evolved Universal Terrestrial Radio Access (E-UTRA); Medium Access Control (MAC) protocol specification (3GPP TS 36.321 version 16.2.0 Release 16) (Nov. 2020).

* cited by examiner

*Primary Examiner* — Mohamed A Kamara
*Assistant Examiner* — Rachel Elizabeth Marks
(74) *Attorney, Agent, or Firm* — Michael Y. Saji

(57) ABSTRACT

Methods are disclosed for an adaptive Transmit Time Interval (TTI) Bundling Configuration using a measurement gap. In one embodiment the method includes scheduling allocation of a TTI bundle wherein part of the TTI bundle overlaps a measurement gap; transmitting, by a User Equipment (UE), only a part of the scheduled TTI bundle; and scheduling other UEs to use the resources not used by the scheduled TTI bundle.

7 Claims, 8 Drawing Sheets

| | 0 | 1 | 2 | 3 | 4 | 5 | 6 | 7 | 8 | 9 | 10 | 11 |
|---|---|---|---|---|---|---|---|---|---|---|---|---|
| UE UL | | TTI B | | | | | | | | | | |
| M GAP | | | | | | | | | | | | |
| | 40 | 41 | 42 | 43 | 44 | 45 | 46 | 47 | 48 | 49 | 50 | 51 |
| UE UL | | | | | | | | | | | TTI B | |
| M GAP | | | | | | | | | | | | |
| | 80 | 81 | 82 | 83 | 84 | 85 | 86 | 87 | 88 | 89 | 90 | 91 |
| UE UL | | | | | TTI B | | | | | | | |
| M GAP | | | | | | | | | | | | |

ADAPTIVE TTI BUNDLING CONFIGURATION

CROSS-REFERENCE TO RELATED APPLICATIONS

This application claims priority under 35 U.S.C. § 119(e) to U.S. Provisional Pat. App. No. 63/127,496, filed Dec. 18, 2020, titled "Adaptive TTI Bundling Configuration" which is hereby incorporated by reference in its entirety for all purposes. This application also hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes, US02, US03, 71710US01, 71721US01, 71729US01, 71730US01, 71731US01, 71756US01, 71775US01, 71865US01, and 71866US01, respectively. This document also hereby incorporates by reference U.S. Pat. Nos. 9,107,092, 8,867,418, and 9,232, 547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND

In LTE, the specifications define a way to enhance the transmission to uplink for UEs located near the cell edge. This method is especially relevant to achieve better VoLTE QOS as due to latency it is hard to reach full HARQ retransmission cycle before the need to transmit the following VoLTE packet.

SUMMARY

Methods for adaptive Transmit Time Intervals (TTI) bundling configurations are described. In one example embodiment a method of an adaptive TTI Bundling Configuration using a measurement gap, includes scheduling allocation of a TTI bundle wherein pat of the TTI bundle overlaps a measurement gap; transmitting, by a User Equipment (UE), only a part of the scheduled TTI bundle; and scheduling other UEs to use the resources not used by the scheduled TTI bundle.

In another example embodiment a method of adaptive Transmit Time Interval (TTI) Bundling Configuration using a Secondary cell (Scell) MAC control element, includes configuring attached UEs with TTI bundling and Scell; activating an Scell to the UEs; and determining whether TTI bundling is needed to a specific UE, and if so, then sending, by an eNodeB (eNB), an Scell deactivation MAC control element with the UL grant, allocating the VoLTE UL traffic.

BRIEF DESCRIPTION OF THE DRAWINGS

FIG. 2 is a diagram showing a TTI bundling scheduling pattern wherein part of the bundle is on a measurement gap, in accordance with some embodiments.

FIG. 3 is a diagram showing a second TTI bundling scheduling pattern wherein part of the bundle is on a measurement gap, in accordance with some embodiments.

FIG. 4 is a diagram showing an enhanced HARQ pattern, in accordance with some embodiments.

DETAILED DESCRIPTION

LTE standard in release 8 and afterwards 12 introduced TTI Bundling. This feature allows cell edge UEs to transmit fast full cycle of HARQ redundancy version helping to gain performance on its uplink PUSCH transmission to the eNodeB. The problem is the eNodeB must reserve the same resources for the UE for four consecutive TTIs. In this disclosure we propose way to create smaller size allocation allowing the eNodeB to allocate any number between 2-4 TTIs saving resources on loaded cells.

Figure 1:
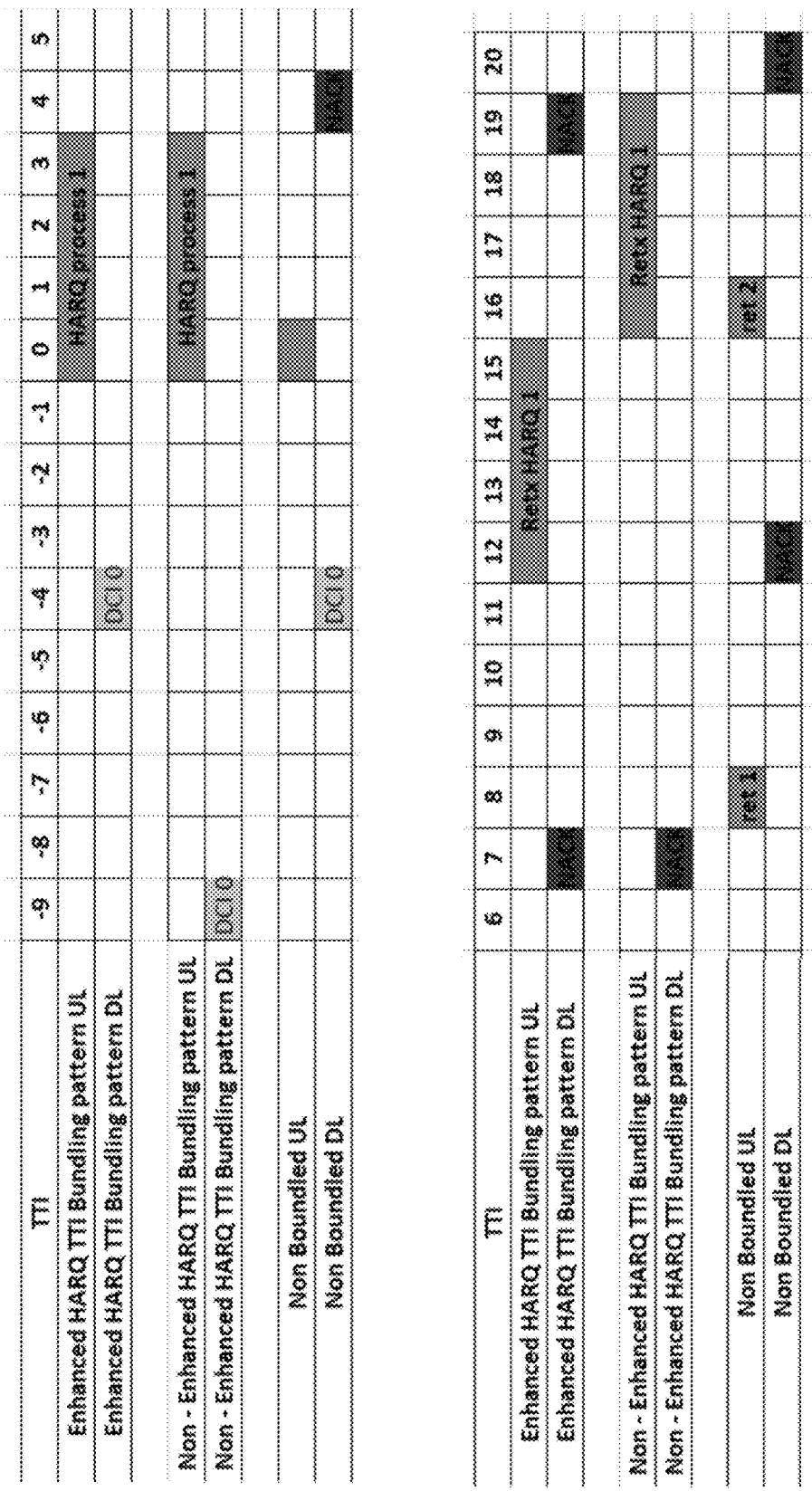
FIG. 1 is a diagram showing a TTI bundling scheduling pattern, in accordance with some embodiments.

FIG. 1 shows TTI Bundling scheduling pattern 100.

Comparing non bundled UL transmission it can be seen easily the benefit using TTI Bundling: faster HARQ retransmission cycles inside each bundle allows the UE to transmit fast gaining the coding gain without the need to wait more than 24 TTIs for full HARQ transmission.

The problem in this method is that it is very resource consuming:

Once configuring the UE, PUSCH UL transmission will follow this pattern: transmission of four consecutive TTIs. Limiting the bundle to less than four consecutive TTIs may be needed especially when the cell is loaded and the current SINR/path loss of the TTI Bundled UE is high enough so less than four consecutive TTIs will be sufficient for good packet reception.

If the eNodeB was able to schedule bundle of 3 or three consecutive TTIs it could've use the vacant resources for other UEs making the eNodeB more robust for increased eNodeB load while allowing sufficient gain for UEs in the cell edge.

Solution to Problem #1

The standard on TS36.321 (incorporated by reference herein in it's entirety) specify for UE measurement gap:

Within a bundle HARQ retransmissions are non-adaptive and triggered without waiting for feedback from previous transmissions according to TTI_BUNDLE_SIZE. The HARQ feedback of a bundle is only received for the last TTI of the bundle (i.e. the TTI corresponding to TTI_BUNDLE_SIZE), regardless of whether a transmission in that TTI takes place or not (e.g. when a measurement gap occurs)—from 5.4.2.1 HARQ entity Scheduling the allocation in a way that part of the bundle will be on the measurement gap, will cause the UE to transmit only part of the scheduled TTI Bundle allowing the eNodeB to schedule other UEs over these vacant resources If more TTIs are needed the eNodeB can give the periodic VoLTE allocation in an offset that will not collide with the measurement gap—allowing the UE to transmit over the whole bundle and gain from full four TTIs bundle transmission.

Below we propose two possible implementations or embodiments.

Using Regular TTI Bundling HARQ pattern

In order to be able to use this technique we may configure the UE to use regular TTI Bundling HARQ pattern (have 4 HARQ process instead of 3) this will allow the UE to collide in the same way 80 ms with the measurement gap.

Assuming usage of 40 ms aggregated VoLTE packet $2^{nd}$ volte packet of HARQ process 2 will collide with the measurement gap giving total resource save of:

$$resource_{save} = \frac{N_{TTI\,Overlapp}}{BundleDuration} * \frac{1}{2} = \frac{N_{TTI\,Overlapp}}{8}$$

Figures 2, 3:
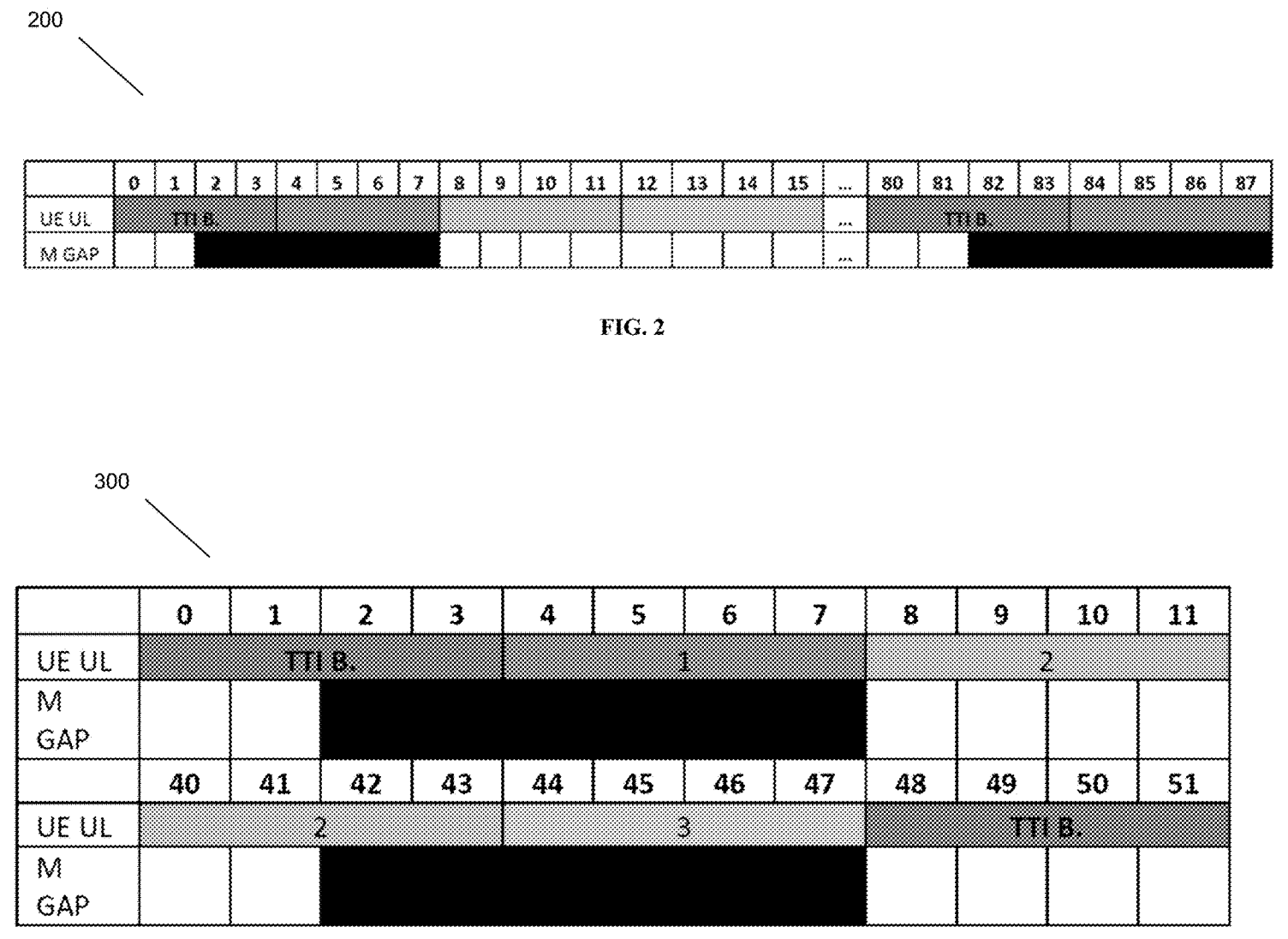

As valid value for the number of TTIs with overlap to the measurement gap can be configured to be [0,1,2,4] the percentage of resource save will be 0, 12.5%, 25% and 37.5% of the Bundle resources over time respectively, as shown in the diagram 200 shown in FIG. 2.

It is possible to offer additional enhancement by using the pattern shown in diagram 300 shown in FIG. 3.

A measurement gap with periodicity of 80 ms will be using HARQ process ID 0 as can be seen in the green rectangles A measurement between with periodicity of 40 ms will use HARQ process ID 2 as can be seen in the $2^{nd}$ line.

Using Enhanced HARQ Pattern

Using enhanced HARQ pattern as defined in Release 12 means that there are 3 HARQ processes here in order to have the same overlap as required by the eNodeB uplink link adaptation assuming periodicity to 40 ms of two VoLTE aggregated messages 40 ms it is required to use different HARQ process to transmit the packet in the following way shown in diagram 400 in FIG. 4.

For the $1^{st}$ packet HARQ process ID 0 will be used. For the $2^{nd}$ HARQ process ID 1 will be used and for the $3^{rd}$ period of 40 ms measurement gap HARQ process ID 2 will be used.

Figure 5:
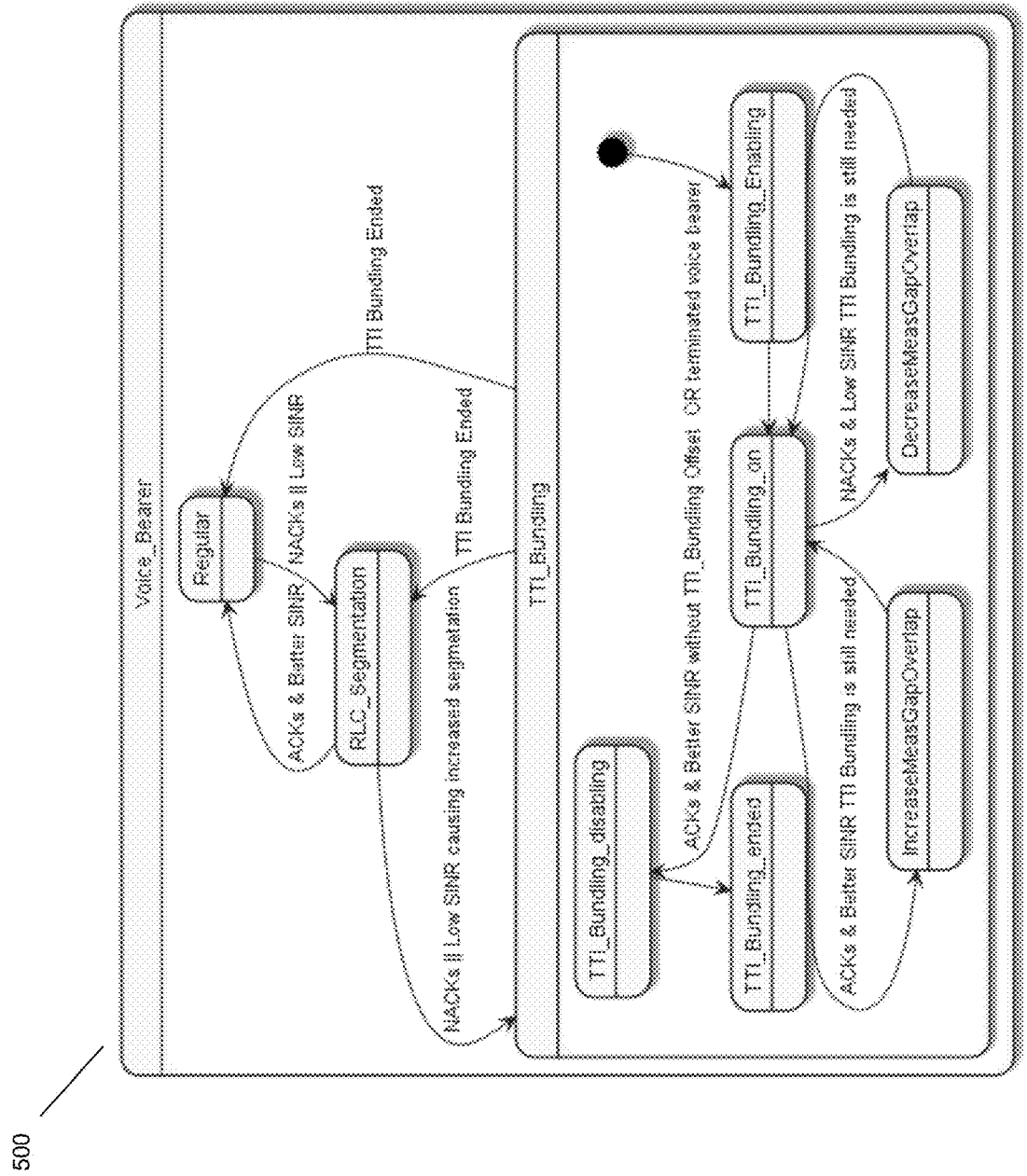
FIG. 5 is a diagram of a state machine for adaptive bundling, in accordance with some embodiments.

FIG. 5 shows a state machine 500 which can manage adaptive TTI Bundling in case of changes of the path loss when TTI Bundling is enabled on the cell edge UE. In another embodiment, a method for adaptive TTI bundling configuration by using Scell MAC control element is described.

LTE standard in release 8 and afterwards 12 introduced TTI Bundling. This feature allows cell edge UEs to transmit fast full cycle of HARQ redundancy version helping to gain on its uplink PUSCH transmission to the eNodeB. The problem is the eNodeB must reserve the same resources for the UE for four consecutive TTIs. In this disclosure we propose way to create smaller size allocation allowing the eNodeB to allocate any number between 2-4 TTIs saving resources on loaded cells.

Comparing non bundled UL transmission it can be seen easily the benefit using TTI Bundling: faster HARQ retransmission cycles inside each bundle allows the UE to transmit fast gaining the coding gain without the need to wait more than 24 TTIs for full HARQ transmission.

The problem in this method is that it is very resource consuming: once configuring the UE, PUSCH UL transmission will follow this pattern: transmission of four consecutive TTIs.

The UE will transmit all the four TTIs limit the eNodeB resources even if only two or three retransmission are more than enough On the one hand TTI bundling is very useful in expending the range of a VoLTE call, while on the other hand it is very not efficient in terms of UL resources.

In addition, TTI bundling enable/disable is done by using RRC reconfiguration message and invoke a lot of signaling messages.

Therefore, there is a need to create a mechanism which allows enable/disable TTI bundling without using signaling message.

Solution to Problem #2

As per TS36.213 (incorporated by reference herein in it's entirety) TTI bundling is not supported when the MAC entity is configured with one or more SCells with configured uplink. Therefore, activation/deactivation of Scell can be used to enable/disable TTI bundling.

All the attached UEs (and if TTI bundling and carrier aggregation is supported) shall be configured with both TTI bundling and with Scell (RRC configured).

Scell shall be activated to all the UEs by using the defined MAC control element.

Scheduler will be able to schedule PDSCH on the Scell if needed.

If TTI bundling is needed to a specific UE, eNB shall send Scell deactivation MAC control element with the UL grant (DCI 0), allocating the VoLTE UL traffic.

Since TTI bundling was already configured, once Scell will be deactivated TTI bundling will be enabled.

Figure 6:
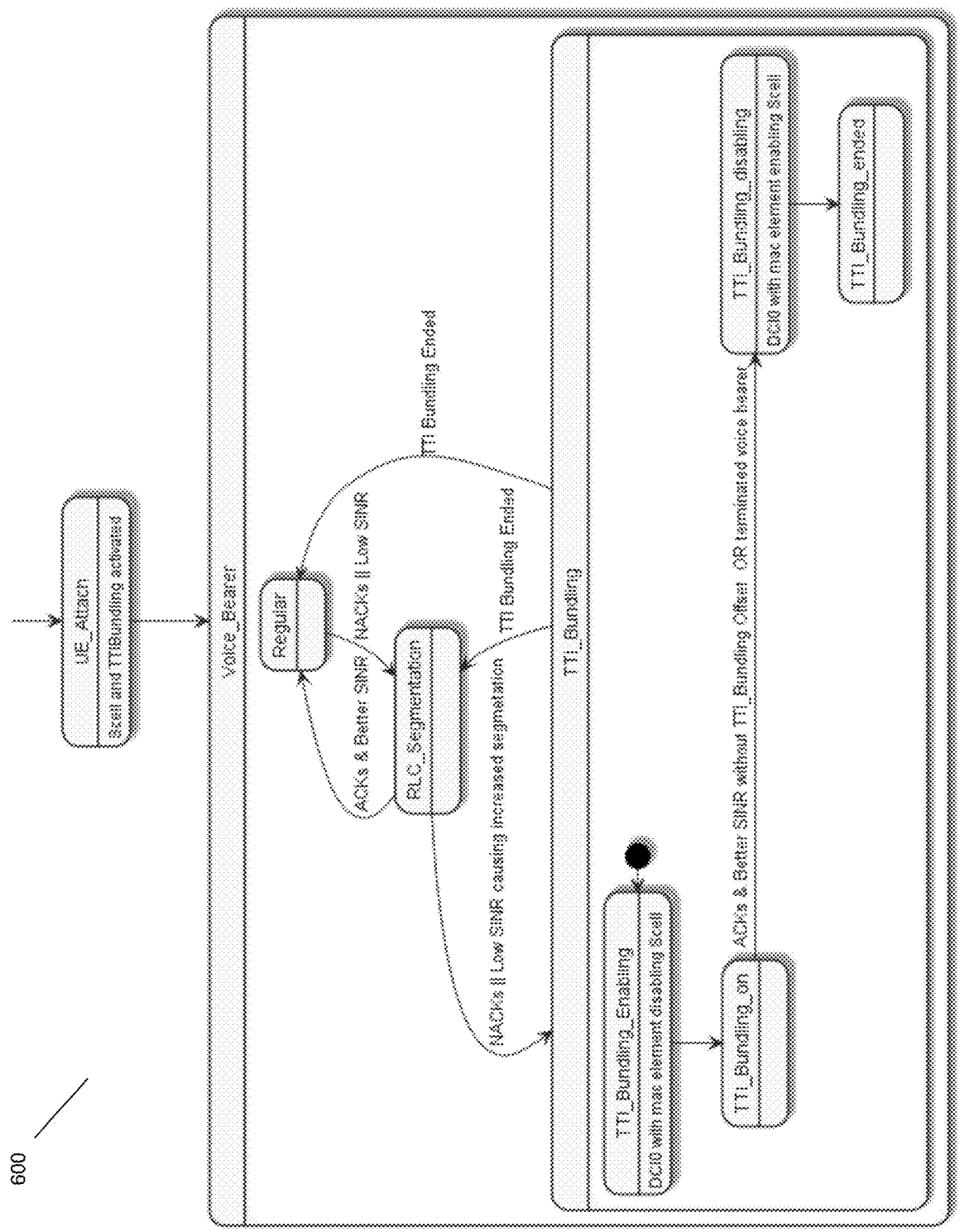
FIG. 6 is a diagram of a second state machine for adaptive bundling, in accordance with some embodiments.

If TTI bundling is not needed anymore, eNB shall activate the Scell and therefore the UE will stop send UL traffic in a bundle. This is shown in the state machine 600 shown in FIG. 6.

Figure 7:
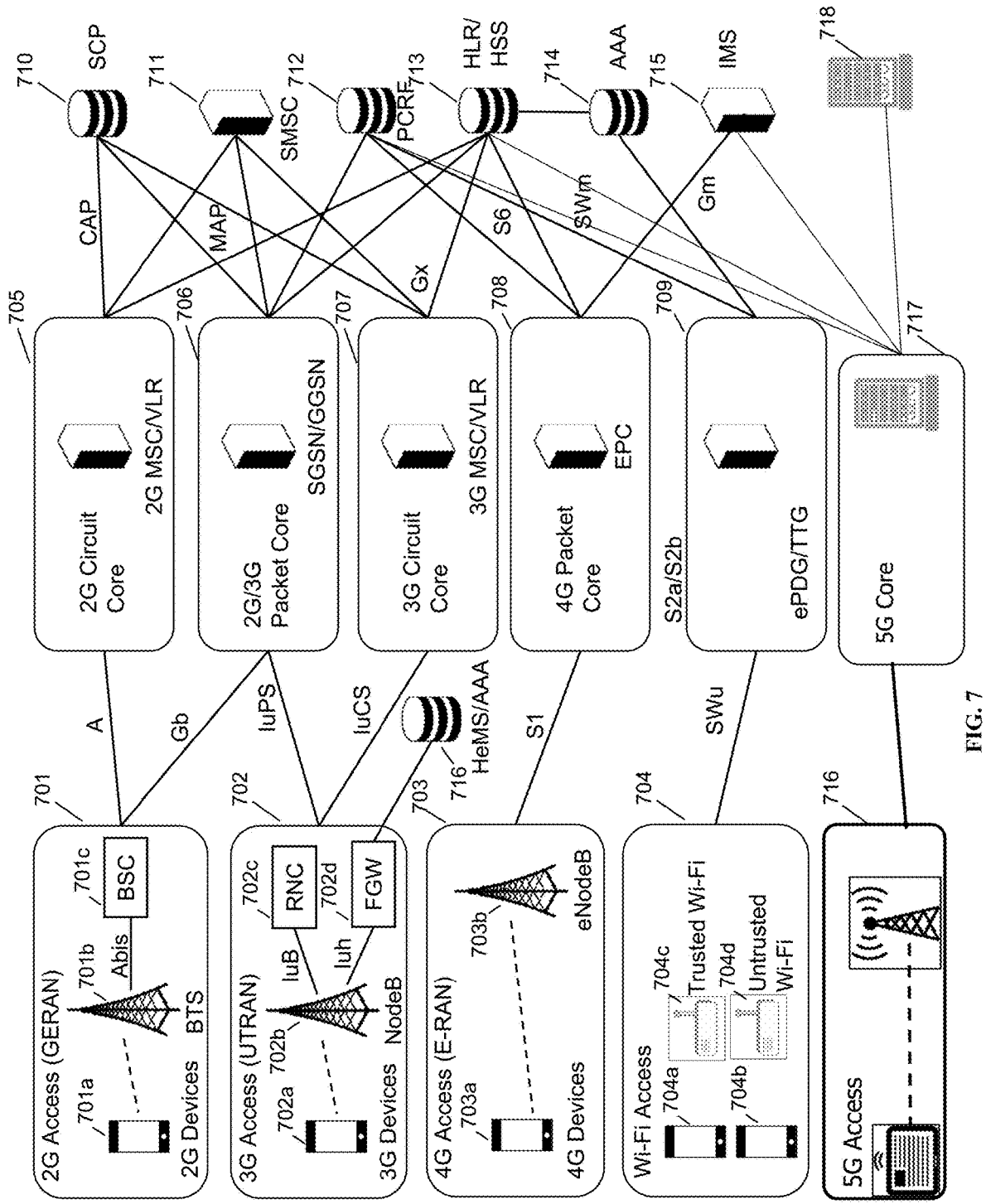
FIG. 7 is a schematic network architecture diagram for 3G and other-G prior art networks.

FIG. 7 is a schematic network architecture diagram for 3G and other-G prior art networks. The diagram shows a plurality of "Gs," including 2G, 3G, 4G, 5G and Wi-Fi. 2G is represented by GERAN 701, which includes a 2G device 701*a*, BTS 701*b*, and BSC 701*c*. 3G is represented by UTRAN 702, which includes a 3G UE 702*a*, nodeB 702*b*, RNC 702*c*, and femto gateway (FGW, which in 3GPP namespace is also known as a Home nodeB Gateway or HNBGW) 702*d*. 4G is represented by EUTRAN or E-RAN 703, which includes an LTE UE 703*a* and LTE eNodeB 703*b*. Wi-Fi is represented by Wi-Fi access network 704, which includes a trusted Wi-Fi access point 704*c* and an untrusted Wi-Fi access point 704*d*. The Wi-Fi devices 704*a* and 704*b* may access either AP 704*c* or 704*d*. In the current network architecture, each "G" has a core network. 2G circuit core network 705 includes a 2G MSC/VLR; 2G/3G packet core network 706 includes an SGSN/GGSN (for EDGE or UMTS packet traffic); 3G circuit core 707 includes a 3G MSC/VLR; 7G circuit core 708 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 730, the SMSC 731, PCRF 732, HLR/HSS 733, Authentication, Authorization, and Accounting server (AAA) 734, and IP Multimedia Subsystem (IMS) 735. An HeMS/AAA 736 is present in some cases for use by the 3G UTRAN. The diagram is used to indicate schematically the basic functions of each network as known to one of skill in the art, and is not intended to be exhaustive. For example, 5G core 717 is shown using a single interface to 5G access 716, although in some cases 5G access can be supported using dual connectivity or via a non-standalone deployment architecture.

Noteworthy is that the RANs 701, 702, 703, 704 and 736 rely on specialized core networks 705, 706, 707, 708, 709, 737 but share essential management databases 730, 731, 732, 733, 734, 735, 738. More specifically, for the 2G GERAN, a BSC 701*c* is required for Abis compatibility with BTS 701*b*, while for the 3G UTRAN, an RNC 702*c* is required for Iub compatibility and an FGW 702*d* is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

Figure 8:
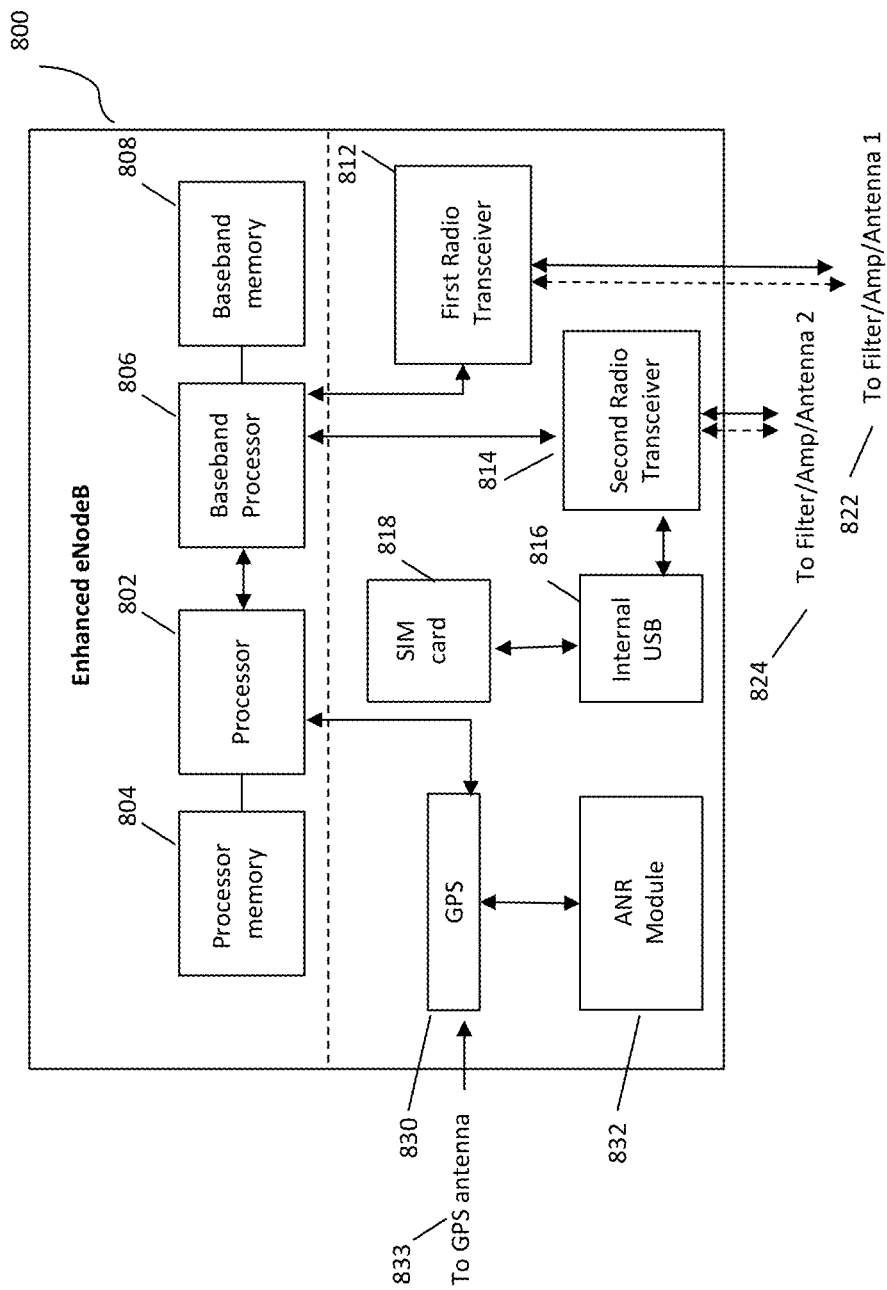
FIG. 8 is an enhanced eNodeB for performing the methods described herein, in accordance with some embodiments.

FIG. 8 is an enhanced eNodeB for performing the methods described herein, in accordance with some embodiments. Mesh network node 800 may include processor 802, processor memory 804 in communication with the processor, baseband processor 806, and baseband processor memory 808 in communication with the baseband processor. Mesh network node 800 may also include first radio transceiver 812 and second radio transceiver 814, internal universal serial bus (USB) port 816, and subscriber information module card (SIM card) 818 coupled to USB port 816. In some embodiments, the second radio transceiver 814 itself may be coupled to USB port 816, and communications from the baseband processor may be passed through USB port 816. The second radio transceiver may be used for wirelessly backhauling eNodeB 800.

Processor 802 and baseband processor 806 are in communication with one another. Processor 802 may perform routing functions, and may determine if/when a switch in network configuration is needed. Baseband processor 806 may generate and receive radio signals for both radio transceivers 812 and 814, based on instructions from processor 802. In some embodiments, processors 802 and 806 may be on the same physical logic board. In other embodiments, they may be on separate logic boards.

Processor 802 may identify the appropriate network configuration, and may perform routing of packets from one network interface to another accordingly. Processor 802 may use memory 804, in particular to store a routing table to be used for routing packets. Baseband processor 806 may perform operations to generate the radio frequency signals for transmission or retransmission by both transceivers 810 and 812. Baseband processor 806 may also perform operations to decode signals received by transceivers 812 and 814. Baseband processor 806 may use memory 808 to perform these tasks.

The first radio transceiver 812 may be a radio transceiver capable of providing LTE eNodeB functionality, and may be capable of higher power and multi-channel OFDMA. The second radio transceiver 814 may be a radio transceiver capable of providing LTE UE functionality. Both transceivers 812 and 814 may be capable of receiving and transmitting on one or more LTE bands. In some embodiments, either or both of transceivers 812 and 814 may be capable of providing both LTE eNodeB and LTE UE functionality. Transceiver 812 may be coupled to processor 802 via a Peripheral Component Interconnect-Express (PCI-E) bus, and/or via a daughtercard. As transceiver 814 is for providing LTE UE functionality, in effect emulating a user equipment, it may be connected via the same or different PCI-E bus, or by a USB bus, and may also be coupled to SIM card 818. First transceiver 812 may be coupled to first radio frequency (RF) chain (filter, amplifier, antenna) 822, and second transceiver 814 may be coupled to second RF chain (filter, amplifier, antenna) 824.

SIM card 818 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 800 is not an ordinary UE but instead is a special UE for providing backhaul to device 800.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 812 and 814, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 802 for reconfiguration.

A GPS module 830 may also be included, and may be in communication with a GPS antenna 832 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 832 may also be present and may run on processor 802 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 9:
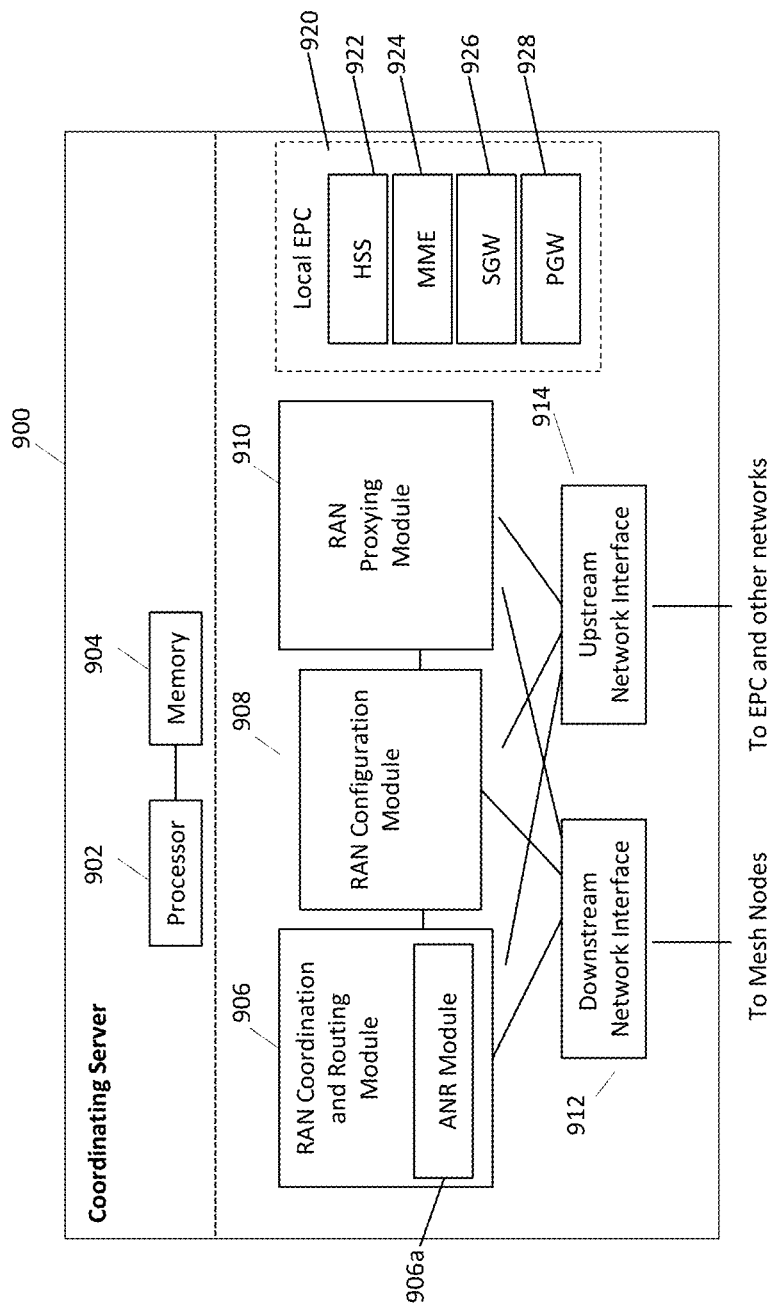
FIG. 9 is a coordinating server for providing services and performing methods as described herein, in accordance with some embodiments.

FIG. 9 is a coordinating server for providing services and performing methods as described herein, in accordance with some embodiments. Coordinating server 900 includes processor 902 and memory 904, which are configured to provide the functions described herein. Also present are radio access network coordination/routing (RAN Coordination and routing) module 906, including ANR module 906a, RAN configuration module 908, and RAN proxying module 910. The ANR module 906a may perform the ANR tracking, PCI disambiguation, ECGI requesting, and GPS coalescing and tracking as described herein, in coordination with RAN coordination module 906 (e.g., for requesting ECGIs, etc.). In some embodiments, coordinating server 900 may coordinate multiple RANs using coordination module 906. In some embodiments, coordination server may also provide proxying, routing virtualization and RAN virtualization, via modules 910 and 908. In some embodiments, a downstream network interface 912 is provided for interfacing with the RANs, which may be a radio interface (e.g., LTE), and an upstream network interface 914 is provided for interfacing with the core network, which may be either a radio interface (e.g., LTE) or a wired interface (e.g., Ethernet).

Coordinator 900 includes local evolved packet core (EPC) module 920, for authenticating users, storing and caching priority profile information, and performing other EPC-dependent functions when no backhaul link is available. Local EPC 920 may include local HSS 922, local MME 924, local SGW 926, and local PGW 928, as well as other modules. Local EPC 920 may incorporate these modules as software modules, processes, or containers. Local EPC 920 may alternatively incorporate these modules as a small number of monolithic software processes. Modules 906, 908, 910 and local EPC 920 may each run on processor 902 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof.

The word "cell" is used herein to denote either the coverage area of any base station, or the base station itself, as appropriate and as would be understood by one having skill in the art. For purposes of the present disclosure, while actual PCIs and ECGIs have values that reflect the public land mobile networks (PLMNs) that the base stations are part of, the values are illustrative and do not reflect any PLMNs nor the actual structure of PCI and ECGI values.

In the above disclosure, it is noted that the terms PCI conflict, PCI confusion, and PCI ambiguity are used to refer to the same or similar concepts and situations, and should be understood to refer to substantially the same situation, in some embodiments. In the above disclosure, it is noted that PCI confusion detection refers to a concept separate from PCI disambiguation, and should be read separately in relation to some embodiments. Power level, as referred to above, may refer to RSSI, RSFP, or any other signal strength indication or parameter.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, 5G, legacy TDD, or other air interfaces used for mobile telephony. 5G core networks that are standalone or non-standalone have been considered by the inventors as supported by the present disclosure.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols including 5G, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to 5G networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method of an adaptive Transmit Time Interval (TTI) Bundling Configuration using a measurement gap, comprising:
   scheduling allocation of a TTI bundle wherein part of the TTI bundle overlaps a measurement gap;
   transmitting, by a User Equipment (UE), only a part of the scheduled TTI bundle;
   scheduling other UEs to use the resources not used by the scheduled TTI bundle; and
   determining when TTI bundling is no longer required, and activating Scell wherein the UE stops sending UL traffic in a bundle.

2. The method of claim 1 wherein when more TTIs are needed then providing a periodic Voice over Long Term Evolution (VOLTE) allocation an offset that will not collide with a measurement gap.

3. The method of claim 1 further comprising retransmitting a Hybrid Automatic Repeat Request (HARQ) within a bundle without waiting for feedback from a previous transmission according to a TTI_BUNDLE_SIZE.

4. The method of claim 3 further comprising wherein a HARQ feedback of a bundle is only received for the last TTI of the bundle, regardless of whether a transmission in that TTI takes place.

5. A method of adaptive Transmit Time Interval (TTI) Bundling Configuration using a Secondary cell (Scell) MAC control element, comprising:
   configuring attached UEs with TTI bundling and Scell;
   activating an Scell to the UEs;
   determining whether TTI bundling is needed to a specific UE, and if so, then sending, by an eNodeB (eNB), an Scell deactivation MAC control element with the UL grant, allocating the VOLTE UL traffic; and
   determining when TTI bundling is no longer required, and activating Scell wherein the UE stops sending UL traffic in a bundle.

6. The method of claim 5 wherein activating an Scell is done using a defined MAC control element.

7. The method of claim 5 further comprising enabling TTI bundling once Scell is deactivated.

* * * * *